May 27, 1958 E. J. GARGINI 2,836,649

TELEVISION SIGNAL DISTRIBUTION APPARATUS UTILIZING LINE SCANNING PULSES MODULATED ON THE FRAME SCANNING PULSE

Filed June 20, 1951 2 Sheets-Sheet 1

Inventor
ERIC JOHN GARGINI
By Ralph E. Atherton
Attorney

May 27, 1958 E. J. GARGINI 2,836,649

TELEVISION SIGNAL DISTRIBUTION APPARATUS UTILIZING
LINE SCANNING PULSES MODULATED ON
THE FRAME SCANNING PULSE

Filed June 20, 1951 2 Sheets-Sheet 2

Inventor
ERIC JOHN GARGINI
By Ralph E. Atherton
Attorney 2,836,649

TELEVISION SIGNAL DISTRIBUTION APPARATUS UTILIZING LINE SCANNING PULSES MODULATED ON THE FRAME SCANNING PULSE

Eric John Gargini, Yiewsley, England, assignor to Electric & Musical Industries Limited, Hayes, Middlesex, England, a company of Great Britain Application June 20, 1951, Serial No. 232,577

Claims priority, application Great Britain June 28, 1950

7 Claims. (Cl. 178—5.6)

This invention relates to television relay apparatus.

It has been proposed hitherto to operate television relay systems in which television broadcasts are received by a programme-distributing unit, demodulated and amplified, and then distributed by cable after being modulated on to a suitable carrier, to a plurality of terminal receiving units, located for example in different dwelling houses. It is manifestly desirable to employ only the minimum number of components in the terminal units located in the dwelling houses so that the initial cost and also maintainence costs will be reduced. It is known, moreover, that a large part of the complexity of a television receiving unit is associated with the scanning circuits for the cathode ray image reproducing tube.

An object of the present invention is to provide improved television relay apparatus with a view to simplifying the scanning circuits in the terminal units thereof.

A further object of the present invention is to provide improved television relay apparatus wherein a special scanning waveform is generated at the programme distributing unit and distributed to the terminal units so that scanning circuits of a simple construction can be employed in the terminal units.

A further object of the present invention is to provide improved television relay apparatus in which the frame deflections for the cathode ray image reproducing tube of the terminal units are produced merely by integrating a scanning waveform fed from a distributing unit.

According to the present invention there is provided television relay apparatus comprising means for receiving broadcast television signals including line synchronising signals and frame synchronising signals, a waveform generator for generating a composite scanning waveform timed by said synchronising signals and comprising a line frequency waveform superimposed on a pulse waveform of frame frequency in which there are intervals between successive pulses corresponding to frame return intervals, at least one terminal unit remote from said receiving means and said generator, means for feeding vision signals received by said receiving means to said unit and simultaneously feeding said composite scanning waveform to said unit, said unit comprising a cathode ray image reproducing tube, means for modulating the beam of said tube in response to said vision signals, means for producing line deflections of the beam in said tube in response to said line frequency waveform, integrating means for integrating said composite waveform and means for producing frame deflections of the beam in said tube in response to the output of said integrating means.

Figure 1:
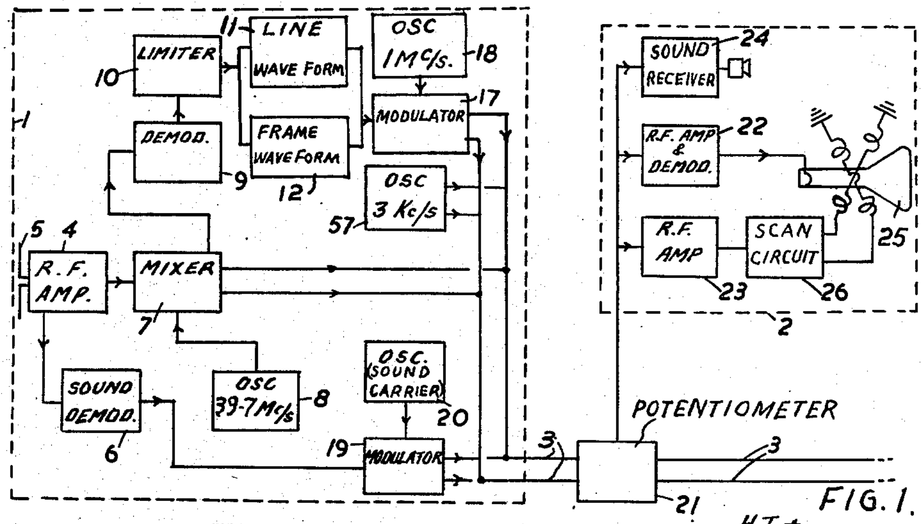
Figure 2:
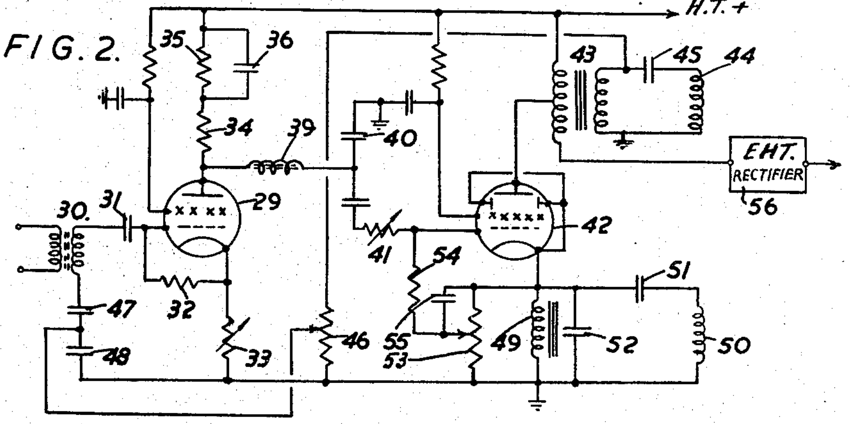
Figure 3:
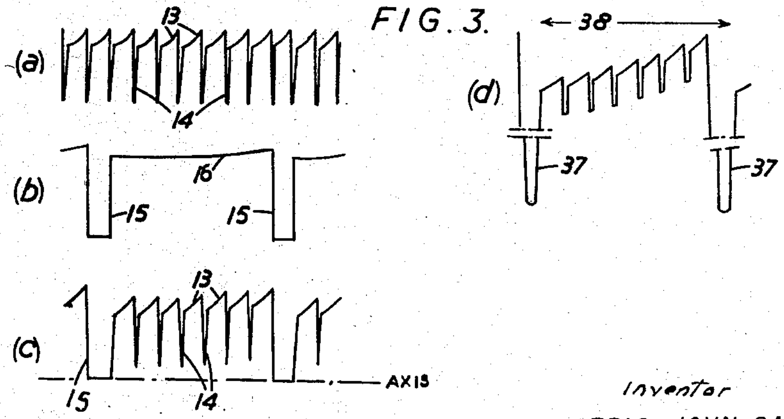
Figure 4:
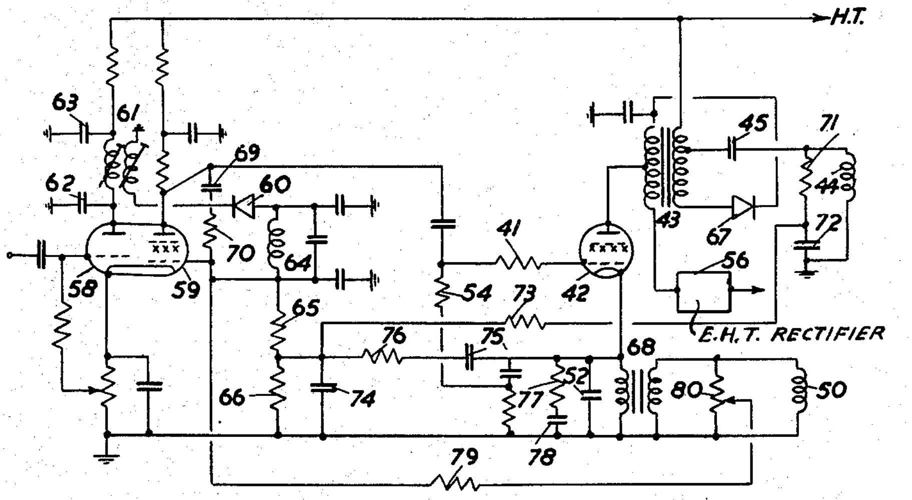

In order that the said invention may be clearly understood and readily carried into effect, the same will now be more fully described with reference to the accompanying drawings, in which:

Figure 1 illustrates diagrammatically and in block form television relay apparatus embodying the present invention, Figure 2 illustrates diagrammatically a detail of the apparatus of Figure 1, Figure 3 comprises waveform diagrams explanatory of the operation of Figures 1 and 2, and Figure 4 illustrates a modification of Figure 2.

Referring to the drawings, the apparatus shown in Figure 1 comprises a distributing unit which is represented by that part of Figure 1 enclosed by the dotted rectangle 1, and a plurality of terminal units one of which is denoted by that part of Figure 1 enclosed by the dotted rectangle 2, the distributing unit being connected solely by a cable, which comprises a balanced pair of conductors 3, to the terminal units. The distributing unit comprises a radio frequency amplifier 4 which may be of conventional construction. It will be assumed that the apparatus is designed for use in a television system in which the vision signals interspersed with synchronising signals are transmitted on one carrier wave of 45 megacycles/second (mc./s.), while the accompanying sound signals are transmitted on a second carrier wave of 41.5 mc./s. Both the carrier waves are picked up by an aerial 5 and fed to the amplifier 4, and the sound carrier wave is separated from the vision carrier wave at a suitable point in the amplifier 4 in known manner and fed to a separate sound demodulator 6. The output of the modulated vision carrier from the circuit 4 is fed to a mixer 7 where the vision signals are mixed with locally generated oscillations of 39.7 mc./s. from an oscillator 8. The mixer 7 sets up oscillations of 5.3 mc./s. modulated with the vision and synchronising signals and these oscillations are fed to the conductors 3. The mixer 7 is arranged to suppress partially the upper side band and the output from the mixer 7, in addition to being fed to the conductors 3 is fed to a demodulator 9 and to a limiter 10 which suppresses the vision signals. The synchronising signal waveform is then fed through isolating stages, not shown, to a line sawtooth waveform generator 11 and to a frame pulse generator 12.

The generator 11 generates a sawtooth waveform variation of line frequency synchronised in known manner by means of the synchronising signals aforesaid. However, before being used for synchronisation the line synchronising signals are passed through a delay network having a time delay of about 90 microseconds so that in effect the line synchronising pulses are applied 10 microseconds early. This advancement compensates for delays in the transmission of pulses in the apparatus. The time delay network preferably has a cut-off frequency of about 50 kc./s., so that it also serves to attenuate transient interference. A fragment of the sawtooth waveform variation is shown in Figure 3(*a*) and it will be observed that each long flank 13 of the waveform has a slight upward curvature while a pronounced negative potential excursion 14 occurs between successive long flanks. The purpose of these features of the waveform will be described later. The frame pulse generator 12 is arranged to produce, under the control of the frame synchronising signals, a frame frequency pulse waveform of the general form indicated in Figure 3(*b*). This waveform comprises frame frequency pulses 16 with intervals of about one line duration between the pulses. Moreover, an upward exponential curvature is superimposed on each frame frequency pulse, and the amplitude of the curvature is about 10 percent of the overall amplitude of the pulses 16. The frame pulse waveform can be generated by employing known pulse generating techniques. The sawtooth waveform variation of Figure 3(*a*) and the frame pulse waveform of Figure 3(*b*) are fed together to a modulator 17 where they are caused to modulate a carrier wave having a frequency of 1 mc./s, generated by an oscillator 18. During the frame pulses 16 the line frequency sawtooth waveform variation modulates said carrier to the extent of about 80 percent at the negative excursions 14 and about 20 percent at the commencement of each of the long flanks 13, and this modulation is added to that due to the pulses 16 which modulates the carrier to about 10 percent at the beginning of each pulse and produce zero modulation at the end of each pulse. During the intervals 15 the carrier is modulated to 100 percent.

The resultant scanning signal waveform as represented by the modulation of the carrier wave is then substantially as shown in Figure 3(*c*), the envelope to one side of the axis only being shown, and the modulated carrier wave is fed from the modulator 17 to the conductors 3 in which it is added to the carrier wave modulated with the vision signals from the mixer 7. The demodulated sound signals from the sound demodulator 6 are fed to a modulator 19 to modulate a further carrier wave of a frequency selected in the range from 54 to 144 kc./s. generated by a further oscillator 20 and the modulated output from 19 is then fed to the conductors 3 in addition to the carrier waves from the mixer 7 and modulator 17. If desired the sound signals of alternative broadcast programmes (not associated with vision signals) can also be used to modulate other carrier waves in the frequency range from 54 to 144 kc./s. and the resultant fed to the conductors 3.

Each terminal unit of the apparatus, such as the unit 2, is fed from a high resistance potentiometer 21 connected between the conductors 3, a fraction of the signals set up across each potentiometer being fed to the respective unit. In the unit 2, say, the signals applied thereto from the potentiometer 21 are fed in parallel to a radio frequency amplifier and demodulator 22 for the 5.3 mc./s. carrier, a radio frequency amplifier 23 for the 1 mc./s. carrier, and a sound channel 24, filters (not separately indicated) being provided as necessary to separate the different signals from one another in known manner. The demodulated output of vision and synchronising signals from the part 22 is applied in known manner to modulate the cathode ray beam in a cathode ray tube 25. The amplified output of 1 mc./s. carrier from the part 23 is fed to a demodulator and wave shaping circuit 26 the output of which comprises scanning waveforms of line and frame frequency which are utilised to deflect the cathode ray beam in the tube 25 in known manner. The circuit 26 also serves to generate E. H. T. for the anode of the tube 25. The circuit 26 is illustrated in more detail in Figure 2.

As shown in Figure 2, the circuit 26 comprises a valve 29, to the control electrode of which the 1 mc./s. carrier is applied via a transformer 30 and condenser 31, a grid leak resistance 32 being provided to cause the valve 29 to operate as a grid leak detector. An adjustable feedback resistor 33 is connected to the cathode lead of the valve 29. The anode circuit of the valve 29 comprises a load resistance 34 and a shaping circuit consisting of the parallel combination of a resistance 35 and a condenser 36. In operation the valve 29 serves to demodulate the 1 mc./s. carrier and after amplification in the valve the resultant scanning waveforms have the form indicated in Figure 3(*d*). It will be observed that the intervals corresponding to the interruptions 15 during which the 1 mc./s. carrier was suppressed appear at the anode of the valve 29 as large amplitude negative pulses 37 while the sawtooth variations of line frequency are superimposed on the long flanks of a substantially sawtooth waveform variation 38 of frame frequency.

The waveform set up at the anode of the valve 29 is applied to a low pass filter consisting of an inductance 39 and a condenser 40 and which serves to remove oscillations of the carrier frequency. The output of this filter, taken from the junction of 39 and 40, is applied via a variable resistance 41 to an amplifying valve 42. The anode of the valve 42 is connected to the mid-point of the primary winding of a transformer 43, and the line scanning coils 44 for the tube 25 are connected across the secondary winding of transformer 43, a condenser 45 being provided as shown in the secondary winding circuit. The secondary winding is shunted by a high resistance potentiometer 46 whose tap is connected to the junction of condensers 47 and 48 in the grid circuit of the valve 29, providing negative feedback from the line scanning coils 44 to the input circuit of the valve 29. The cathode circuit of the valve 42 comprises a choke 49 which functions to provide negative feedback to the input circuit of the valve 42 at frame frequency the inductance 49 being shunted by the frame scanning coils 50 for the tube 25, the coils 50 being of high impedance and fed from the inductance 49 by blocking condenser 51. The inductance 49 is further shunted by an integrating condenser, which also functions as a by-pass condenser 52 to line frequencies and in particular to the flyback pulses and by a potentiometer 53, the tap on which is connected by a resistance 54 to the grid of the valve 42 and is also connected by a condenser 55 to the cathode of the valve 42. The components 53, 54 and 55 serve to maintain the required operating bias on the grid of the valve 42 and to prevent phase rotation at frame frequency. One end of the primary winding of the transformer 43 is connected to a rectifier 56 which is arranged to produce E. H. T. for the unit 2 in conventional manner and is therefore merely shown in block form.

The waveform of Figure 3(*d*) produces a line frequency current variation of sawtooth waveform in the anode circuit of the valve 42 and a frame frequency current variation of sawtooth waveform in its cathode circuit. Interference between the anode and cathode circuits of the valve 42 is effectively prevented by the selective feedback from the inductance 49 shunted by condenser 52, the impedance of 49 in parallel with 52 being large at frame frequency and negligible at line frequency. The condenser 52 receives an increment of charge during each long flank of the line frequency scanning waveform, the charge remaining effectively unaltered during the line flyback intervals, and the integration of the current pulses in the condenser 52 is instrumental in generating the long flanks of the frame frequency sawtooth waveform variation in the coils 50. The condenser 45 also functions to obviate interference, the condenser 45 being of such capacity as to tune the scanning coils 44 to a frequency below 10 kc./s. thereby reducing the inductive component of the anode load of the valve 42. This enables greater efficiency to be obtained in the valve 42 by reducing the back E. M. F. of the line scan without effecting the back E. M. F. at line flyback. The condenser 45 also reduces the anode load of the valve 42 at frame frequencies to nearly zero enabling maximum power to be obtained in the cathode circuit at frame frequencies. The linearity of the line frequency scanning waveform is controlled by negative feedback from the potentiometer 46 to the input circuit of the valve 29 and adjustment of the tapping of the potentiometer 46 enables the picture aspect ratio at the receiver to be adjusted. In the absence of negative feedback via 46, the amplitude of the line frequency variation in the scanning coils 44 tends to undergo an exponential increase in each frame period due to the frame frequency sawtooth variation of the cathode current in the valve 42. This exponential increase in the amplitude of the line frequency variation may alternatively be counteracted by subjecting the amplitude of the line frequency scanning waveform at the unit 1 to an inverse variation. Adjustment of the resistance 33 in the cathode lead of the valve 29 provides for adjustment of picture size, since adjustment of 33, by affecting the gain of the valve 29, affects both picture height and width. Adjustment of the resistance 41 controls the amplitude of the E. H. T. generated by the rectifier 56. The condenser 45 tends to cause some curvature of the long flanks of the line frequency variation in the coils 44 but this is compensated by the inverse curvature introduced in the long flanks 13 at the distributing unit 1 as above described with reference to Figure 3(*a*). The large amplitude negative excursions 14 in the waveform of Figure 3(*a*) ensure rapid flyback of the current in the coils 44 by switching the valve 42 to cut-off or at least to a very high impedance state during line flyback, and said pulses also serve to ensure that adequate E. H. T. can be generated by the rectifier 56. The negative frame frequency pulses 37 likewise drive the valve 42 to a high impedance state at the end of each frame period, for a sufficient time to allow a rapid dissipation of the energy in the frame scanning circuit, this expedient being required since the valve 42 operates effectively as a cathode follower at frame frequency and frame flyback would otherwise tend to be protracted due to the low cathode impedance of the valve 42.

It may sometimes be desired to operate a television relay apparatus such as described with reference to Figure 1 in areas in which there is no public electricity supply to provide current for the heaters and the H. T. supply in the terminal units. In this case, the necessary power can be transmitted from the unit 1 by means of an additional unmodulated carrier wave. This is indicated in Figure 1 in which the block 57 indicates an oscillation generator operating at a frequency of 3 kc./s. the oscillations being fed to the terminal units by the conductors 3. In some cases, the transmission of power at 3 kc./s. on a three phase system may be desirable. Furthermore, in areas where there is no public electricity supply it may be desirable to transmit the sound accompanying the vision signals as audio frequency signals, in which case the modulator 19 and oscillator 20 of the unit 1 are dispensed with. It is then necessary to transmit the 3 kc./s. oscillations by means of conductors separate from the conductors 3 to avoid interference with the audio frequency signals. The distribution of television sound signals at audio frequency has the advantage of economising in power consumption from the 3 kc./s. oscillations or other similar oscillations during television hours when the loading may be expected to be heaviest, since power will then not be required to operate radio frequency circuits in the sound channels of those terminal units switched to the television programme. Audio signals of alternative sound programmes, modulated in suitable carrier waves may of course be transmitted via the conductors 3 when the oscillator 20 and modulator 19 are used. A frequency of 3 kc./s. for the power-carrying oscillation is proposed because it reduces the liability to interference with other signals transmitted by the same or other conductors in the cable. The frequency of 3 kc./s. aforesaid, has the further advantage of reducing the quantity of iron and capacity of the condensers required in the transformer and smoothing circuits used at the terminals units 2. Moreover, to reduce loading on the oscillator 57 during peak viewing hours it may be possible to transmit the 3 kc./s. carrier wave continuously by the cable 3 and utilise it to charge a storage battery which can be arranged to supply heating current for each of a group of terminal units so that the total number of terminal units may be greatly increased. Such a battery may be of conventional nickel-iron type, delivering an output of about 6.3 volts, and located conveniently to the terminal units. The use of a battery gives the advantage of a more stable low tension supply to the terminal units, with consequent longer life for the valves. If a battery is not used some stabilisation of the 3 kc./s. supply may be necessary for example by switching dummy loads into circuits at times when the number of terminal units operating is reduced.

In other cases where the relay system is operated in a built-up area, it may be desirable to locate parts, including the aerial and the R. F. amplifier, of the distributing unit on an elevated location outside the built-up area. In this case power may be sent to the remotely located part of the distributing unit by cable using a 3 kc./s. two or three phase oscillation as above described.

In a modification of the apparatus illustrated in Figure 1 the vision carrier wave may be demodulated after amplification in the radio frequency amplifier 4, part of the demodulated output is then passed to the limiter and used as in Figure 1 to synchronise the generators 11 and 12. Another part of the demodulated output is fed to a second limiter which removes the synchronising signals leaving only the vision signals. These are then used to modulate a carrier of 5.3 mc./s., or other suitable frequency and fed to the conductors 3. This modification enables more efficient use to be made of the last-mentioned carrier oscillations, since 100 percent modulation with peak signals (black) can be obtained, compared with 70 percent if the synchronising signals are not removed.

In addition, the frame pulse generator 12 may be such that the waveform of Figure 3(*b*) includes a frame frequency suppression portion before and after each interval 15. Such suppression portions may have an amplitude of about 20 percent of that of the pulses 16, for example.

Additional amplification may be provided at different parts of the circuits on Figure 1, as required.

The modified scanning circuit illustrated in Figure 4 operates in essentially the same manner as the scanning circuit illustrated in Figure 2 and corresponding parts in the two circuits have been indicated by the same reference numerals. Figure 4 will therefore be described only insofar as it differs from Figure 2.

In Figure 4, two amplifying valves 58 and 59, and a separate detector 60 replace the combined amplifier and detector valve 29 of Figure 2. The valve 58 amplifies the 1 mc./s. carrier modulated with the scanning waveform, and the detector 60 is coupled to the anode circuit of the valve 58 by a transformer 61 whose primary winding is tuned by the condensers 62 and 63. The network indicated in general by reference 64 is a low pass filter for attenuating carrier oscillations and the resistances 65 and 66 constitute the load for the rectifier 60. The demodulated scanning waveform set up across the resistances 65 and 66 is applied to the control electrode of the valve 59, which as shown is a pentode, and the amplified output, shaped as in Figure 2 by the network 34, 35, 36 is applied to the control electrode of the valve 42. The line scanning circuit associated with this valve is essentially the same as in Figure 2 except that the H. T. for the valve is applied via the secondary winding of the transformer 43 and a rectifier 67. However, in the frame scanning circuit, located in the cathode circuit of the valve 42, the choke 49 is replaced by a step-down transformer 68, which has the frame scanning coils 50 connected across its secondary winding. With this arrangement the coils can be of very low impedance and, moreover, as the impedances external to the transformer 68 are all low, the transformer 68 may also be of low shunt impedance. Since the pentode valve 59 for amplifying the scanning waveform operates with high gain direct negative feedback, as by the condenser 69 and resistance 70, from the anode of this valve to its control electrode can be employed to reduce distortions in the scanning waveform. Additional negative feedback from the line scanning circuit is also derived from the junction of a resistance 71 and condenser 72 connected in series across the line scanning coils 44, the negative feedback from this point being applied via resistance 73 to the junction of the resistances 65 and 66 and thence to the control electrode of the valve 59. The resistance 66 is shunted by a condenser 74, and the condensers 72 and 74 serve to make the negative feedback frequency selective in such a way that the flyback pulses in the feedback signal are substantially attenuated. The negative feedback therefore does not attenuate the flyback pulses in the line scanning circuit so that the switching of the valve 42 to a high impedance state at line flyback times is not interfered with and efficient generation of E. H. T. is not vitiated. Negative feedback from the frame scanning circuit to the control electrode of the valve 59 is also provided, as shown, from the high potential side of the primary winding of the transformer 68 via the condenser 75 and resistance 76 and the feedback by this path is also arranged to be frequency selective on such manner that the fundamental frame frequency and some of the lower harmonics and in addition the negative pulses 37 are substantially attenuated in the feedback signal so as to prevent undue attenuation of these components at the control electrode of the valve 42. The resistance 76 also acts as a stopper to line frequency components. A series combination of a resistance 77 and a condenser 78 is connected across the condenser 52 in the frame scanning circuit as shown. These elements functions as a correcting circuit which prevent an undesirable increase in the amplitude of the line scanning waveform which is otherwise found to occur at the end of each frame flyback interval. A feedback signal is also applied via a stopper resistance 79 to the control electrode of the valve 59 from a potentiometer 80 which shunts the coils 50, this feedback signal being employed to give aspect control.

What I claim is:

1. Television relay apparatus comprising means for receiving broadcast television signals including line synchronising signals and frame synchronising signals, a waveform generator for generating a composite scanning waveform timed by said synchronising signals and comprising a line frequency waveform superimposed on a pulse waveform of frame frequency in which there are intervals between successive pulses corresponding to frame return intervals, at least one terminal unit remote from said receiving means and said generator, means for feeding vision signals received by said receiving means to said unit and simultaneously feeding said composite scanning waveform to said unit, said unit comprising a cathode ray image reproducing tube, means for modulating the beam of said tube in response to said vision signals, means for producing line deflections of the beam in said tube in response to said line frequency waveform, integrating means for integrating said composite waveform, and means for producing frame deflections of the beam in said tube in response to the output of said integrating means.

2. Television relay apparatus comprising means for receiving broadcast television signals including line synchronising signals and frame synchronising signals, means for generating a pulse waveform of the frequency of said frame synchronising signals and in which waveform there are intervals between successive pulses corresponding to frame return intervals, means for generating a substantially sawtooth waveform of the frequency of said line synchronising signals, means for combining said pulse waveform and said sawtooth waveform to produce a composite scanning waveform, at least one terminal unit remote from said receiving means and said generating means, means for feeding vision signals received by said receiving means to said unit and simultaneously feeding said composite scanning waveform to said unit, said unit comprising a cathode ray image reproducing tube, means for modulating the beam of said tube in response to said vision signals, a line deflecting circuit for said tube responsive to said sawtooth waveform, integrating means for integrating said composite waveform, and means for producing frame deflections of the beam in said tube in response to the output of said integrating circuit, the output of said integrating circuit during said intervals between successive pulses producing frame return strokes.

3. Television relay apparatus comprising means for receiving broadcast television signals including line synchronising signals and frame synchronising signals, means for generating a pulse waveform of the frequency of said frame synchronising signals and in which waveform there is an upward exponential curvature superimposed on each pulse and there are intervals between successive pulses corresponding to frame return intervals, means for generating a substantially sawtooth waveform having the frequency of said line synchronising signals, means for combining said pulse waveform and said sawtooth waveform to produce a composite scanning waveform, at least one terminal unit remote from said generating means, means for feeding vision signals received by said receiving means to said unit and for simultaneously feeding said composite scanning waveform to said unit, said unit comprising a cathode ray image reproducing tube, means for modulating the beam of said tube in response to said vision signals, a line deflecting circuit for said tube responsive to said sawtooth waveform, integrating means for integrating said composite waveform, and means for producing frame deflections of the beam in said tube in response to the output of said integrating circuit, the output of said integrating circuit during said intervals between successive pulses producing frame return strokes.

4. Television relay apparatus comprising means for receiving broadcast television signals including line synchronising signals and frame synchronising signals, a waveform generator for generating a composite scanning waveform timed by said synchronising signals and comprising a line frequency waveform superimposed on a pulse waveform of frame frequency in which there are intervals between successive pulses corresponding to frame return intervals, means for modulating a carrier wave with said waveform, at least one terminal unit remote from said receiving means and said generator, a cable leading from said receiving means and said generator to said unit, means for feeding said carrier wave modulated with said waveform to said cable, means for feeding vision signals received by said receiving means to said cable, said unit comprising a cathode ray image reproducing tube, means for modulating the beam of said tube in response to said vision signals, means for producing line deflections of the beam in said tube in response to said line frequency waveform, integrating means for integrating said composite waveform, and means for producing frame deflections of the beam in said tube in response to the output of said integrating means.

5. Television relay apparatus comprising means for receiving broadcast television signals including line synchronising signals and frame synchronising signals, a waveform generator for generating a composite scanning waveform timed by said synchronising signals and comprising a line frequency waveform superimposed on a pulse waveform of frame frequency in which there are intervals between successive pulses corresponding to frame return intervals, means for modulating a carrier wave with said composite scanning waveform to produce substantially one hundred percent modulation during said intervals between successive pulses, at least one terminal unit remote from said receiving means and said generator, a cable leading from said receiving means and said generator to said terminal unit, means for feeding vision signals received by said receiving means to said cable, means for feeding said modulated carrier wave to said cable, said unit comprising a cathode ray image reproducing tube, means for modulating the beam of said tube in response to said vision signals, a line deflecting circuit for said tube responsive to the said line frequency waveform for initiating line return strokes, means for integrating said composite waveform, and means for producing frame deflections of the beam in said tube in response to the output of said integrating means, the output of said integrating means during said intervals producing frame return strokes.

6. Television relay apparatus comprising means for receiving broadcast television signals including line synchronising signals and frame synchronising signals, means for generating a composite scanning waveform timed by said synchronising signals and comprising a line frequency waveform superimposed on a pulse waveform of frame frequency in which there are intervals between successive pulses corresponding to frame return intervals, at least one terminal unit remote from said receiving means and said generator, means for feeding vision signals received bf said receiving means to said unit and simultaneously feeding said composite scanning waveform to said unit, said unit comprising a cathode ray image reproducing tube, means for modulating the beam of said tube in response to said vision signals, and a beam deflecting circuit for said tube comprising a valve having an input circuit to which the composite scanning waveform is applied, a line scanning circuit connected to form one output circuit of said valve and responsive to said line frequency waveform, integrating means connected to integrate part at least of the current output of said valve, and means for producing frame deflections of the beam in said tube in response to the output of said integrating means, the output of said integrating circuit during said interval between successive pulses producing frame return strokes.

7. Television relay apparatus comprising means for receiving broadcast television signals including line synchronising signals and frame synchronising signals, means for generating a composite scanning waveform timed by said synchronising signals and comprising a line frequency waveform superimposed on a pulse waveform of frame frequency in which there are intervals between successive pulses corresponding to frame return intervals, at least one terminal unit remote from said receiving means and said generator, means for feeding vision signals received by said receiving means to said unit and simultaneously feeding said scanning waveform to said unit, said unit comprising a cathode ray image reproducing tube, means for modulating the beam of said tube in response to said vision signals, and a beam deflecting circuit for said tube comprising a valve having at least an anode, a control electrode and a cathode, an input circuit for applying said scanning waveform to said control electrode, a line scanning circuit connected to the anode of said valve, means for integrating the cathode current of said valve, means for producing frame deflections of the beam of said tube in response to the output of said integrating means, the output of said integrating means during said intervals between successive pulses producing frame return strokes.

References Cited in the file of this patent

UNITED STATES PATENTS

| | | |
|---|---|---|
| 2,305,930 | Martinelli | Dec. 22, 1942 |
| 2,496,283 | Gall | Feb. 7, 1950 |
| 2,628,275 | Parker | Feb. 10, 1953 |